United States Patent

[11] 3,600,048

| [72] | Inventor | Mark Makhobey<br>Phoenix, Ariz. |
|---|---|---|
| [21] | Appl. No. | 852,294 |
| [22] | Filed | Aug. 22, 1969 |
| [45] | Patented | Aug. 17, 1971 |
| [73] | Assignee | Avco Corporation<br>Stratford, Conn. |

[54] PRESSURE BALANCED SEGMENTED SEAL
2 Claims, 4 Drawing Figs.

| [52] | U.S. Cl. | 308/187.1,<br>277/27, 277/84, 277/142 |
|---|---|---|
| [51] | Int. Cl. | F16c 33/26,<br>F16j 15/34 |
| [50] | Field of Search | 277/27, 81<br>S, 84, 142, 3, 40, 41; 308/187.1, 36.1 |

[56] References Cited
UNITED STATES PATENTS

| 1,338,955 | 5/1920 | Parsons et al | 277/27 |
| 2,707,118 | 4/1955 | Swartz et al | 277/27 |
| 3,095,713 | 7/1963 | Sahlmann et al | 277/9 X |
| 3,333,855 | 8/1967 | Andresen | 277/40 |

*Primary Examiner*—Samuel B. Rothberg
*Attorneys*—Charles M. Hogan and Cary M. Gron ABSTRACT: The disclosure shows a seal assembly for use with a rotating shaft. A fixed radially extending annular sealing face is positioned around the shaft. A segmented radial-type seal element also surrounds the shaft and has an outer radial face which is urged against the fixed annular face by a suitable spring. A garter spring surrounds the seal element to urge the inner surface of the seal element in sealing engagement with the rotatable shaft. The outer radial face is at the axial midpoint of the seal element so that the resultant radial pressure forces on the periphery and the inner sides of the seal element are substantially constant irrespective of variations in the external pressure differential across the seal.

PATENTED AUG 17 1971

3,600,048

INVENTOR.
MARK MAKHOBEY
BY Charles M. Hogan
Gary M. Gron
ATTORNEYS.

3,600,048

PRESSURE BALANCED SEGMENTED SEAL

BACKGROUND OF THE INVENTION

This invention relates to seal assemblies and more specifically to seal assemblies for use with rotating shafts.

The segmented radial-type seal assembly has long been used with rotating shafts. Frequently this type of seal is found at the ends of bearing sump chambers used to house bearings for a rotating shaft. One of the problems associated with present segmented seal assemblies is that the forces urging them into radial sealing engagement with the rotating shaft varies with the pressure differential across the seal. In many cases pressure differential changes across the seal cause unnecessary friction between the segmented seal and the shaft thereby increasing the wear of the seal.

The invention is characterized by a radial-type segmented seal element surrounding a shaft and having an outer radial face adapted to sealingly engage a fixed annular face. The peripheral surfaces of the seal element extending from its radial face have areas relative to the inner surface of the seal element that result in constant radial forces on the seal, irrespective of variations in the external pressure differential across the seal element.

The above and other related features of the present invention will be apparent from a reading of the description shown in the accompanying drawing and the novelty thereof pointed out in the appended claims.

DESCRIPTION

Figure 1:
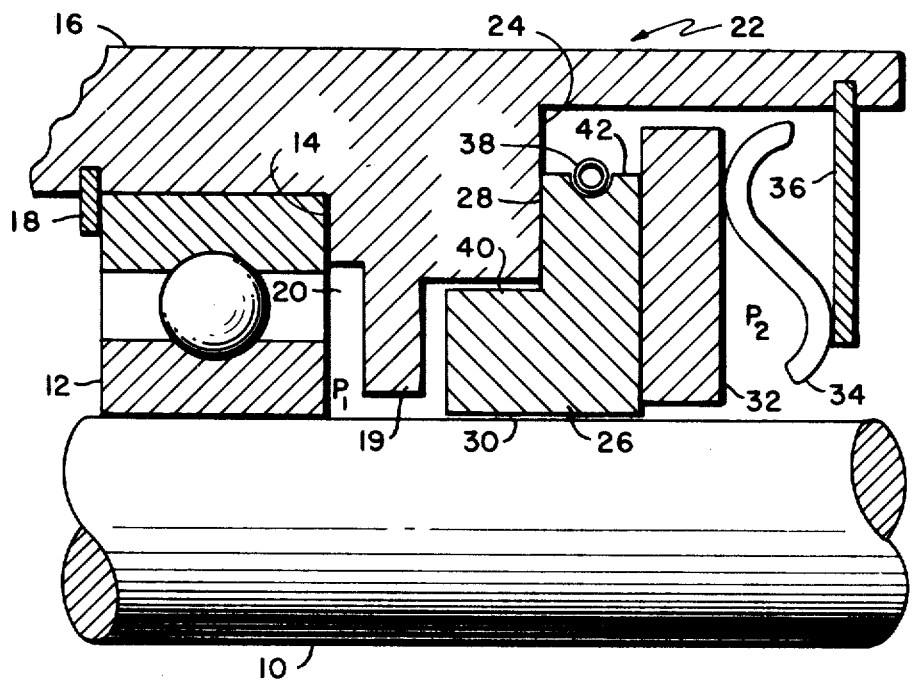
FIG. 1 is a longitudinal view of a seal assembly embodying the present invention.

FIG. 1 illustrates a seal assembly embodying the present invention used with a rotatable shaft 10. The shaft 10 is journaled in a suitable bearing 12 that is secured against a shoulder 14 of a housing 16 by a retaining clip 18. The bearing 12 is normally provided with a lubricating fluid supply and return means. The inner wall of the housing 16 and the shaft 10 form a sump chamber 20 which retains the lubricating fluid for bearing 12. A seal assembly, generally indicated by reference character 22, is provided between the housing 16 and the shaft 10 to seal the sump chamber 20. A baffle 19 prevents direct splashing of oil on seal assembly 22.

The seal assembly 22 comprises a fixed annular, radially extending sealing face 24 formed in housing 16 and positioned generally normal to the axis of rotation of shaft 10. A segmented seal element 26 of carbon or other suitable seal material has an outer radial face 28 adapted to sealingly engage the fixed annular face 24. The segmented seal element 26 has an inner annular surface 30 adapted to sealingly engage the periphery of shaft 10. The segmented seal element 26 is urged into sealing engagement with the shaft 10 by a spring, such as a garter spring 38.

The seal elements 26 are urged against the annular face 24 by a holding plate 32 acted on by a suitable spring such as a wave washer 34. The wave washer 34 is held in place in the housing 16 by suitable retaining ring 36.

In normal practice the exterior side of the seal assembly 22 is pressurized to a level $P_2$ that is higher than the pressure level $P_1$ in sump chamber 20. The pressure differential across seal assembly 22 creates a generally triangular pressure distribution along the inner surface 30 of seal element 26 while the peripheral surfaces 40 and 42 are uniformly acted on by pressures $P_1$ and $P_2$ respectively. For purposes of explanation the resultant pressure forces acting on seal elements 26 by $P_1$, $P_2$ and the garter spring 38, have been segregated. In practice, however, the resultant pressure forces would be the algebraic summation of the individual resultant forces.

Figures 2, 3, 4:
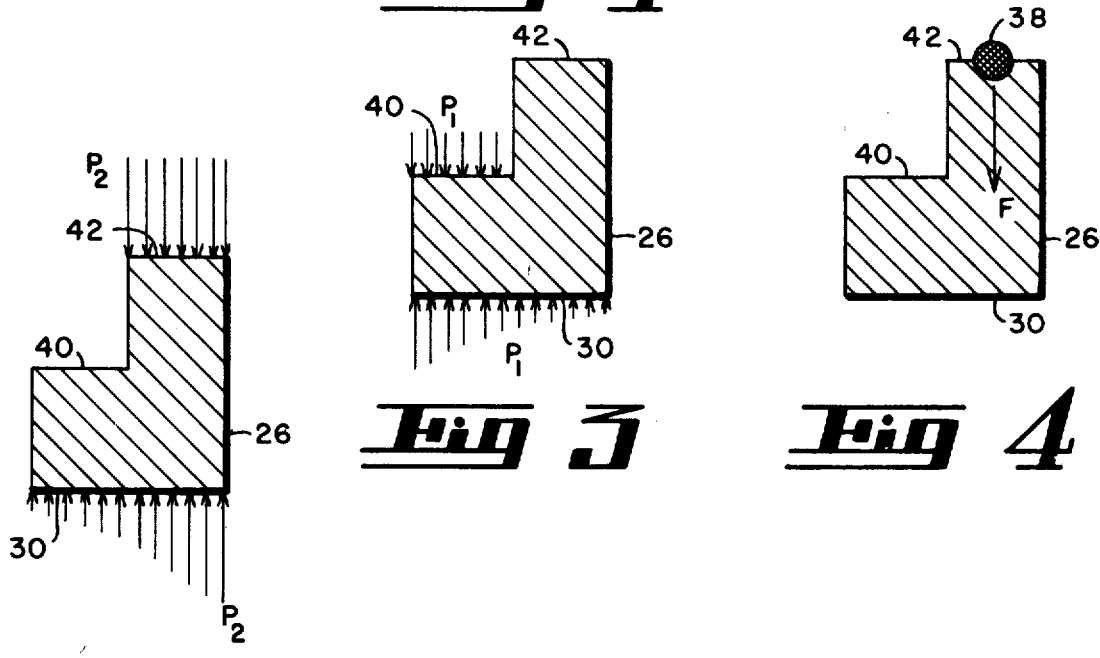
FIGS. 2, 3 and 4 are sectional views of seal elements incorporated in FIG. 1 showing the pressure forces acting on the inner and peripheral surfaces of the seal elements.

Referring particularly to FIG. 2, the pressure on the exterior of the seal assembly $P_2$ acts uniformly over peripheral area 42 of the seal element 26. The same pressure $P_2$ acts on the radially inward side of the seal element 26 with an approximately triangular gradient extending from the value of $P_2$ at the outer edge of the seal down to zero at the inner side of the seal.

The areas of the peripheral surfaces 40 and 42 of the segmented sealing element 26 are proportioned relative to the area of the inner surface 30 so that the radial pressure forces caused by the pressure differential across the seal are substantially constant as described below. The area of surface 42 is selected to be one-half of the area of surface 30. As a result, the resultant forces acting on seal element 26 are: $P_2 \times$ (Area of surface 42) $= P_2 \times \frac{1}{2} \times$ (Area of surface 30, or two times the area of surface 42) Thus it can be seen that the inward and outward radial forces resulting from $P_2$ cancel one another so that the level of $P_2$ has substantially no effect on the radial forces on seal element 26.

FIG. 3 illustrates the pressure forces resulting from pressure $P_1$ or the pressure on the interior of the sump. $P_1$ acts uniformly over area 40 on the periphery area seal element 26 that is exposed to sump chamber pressures. The same pressure $P_1$ acts over the inner surface 30 of seal element 26 in an approximately triangular gradient. Radial face 28 is at the axial midpoint of seal element 26 so that the area of surface 40 is one-half the area of inner surface 30. The forces may be summed as follows: $P_1 \times$ (Area of Surface 40) $= P_1 \times \frac{1}{2} \times$ (Area of surface 30, or twice the area of surface 40) As is the case with $P_2$, variations in $P_1$ will not affect the resultant radial pressure level across the seal.

Since the pressure radial forces due to the pressure differential across the seal are constant irrespective of pressure variations, the only net force tending to urge the seal elements radially inward is the force F from the garter spring 38, as shown in FIG. 4.

It can be seen that what has been provided is an extremely simplified seal that has practically no sensitivity to pressure variations in the pressure differential across the seal. As a result, the radial force urging the seal element 26 into engagement with shaft 10 may be controlled to provide maximum sealing effectiveness and minimum wear.

Having thus described the invention, what I claim as novel and desired to be secured by Letters Patent of the U.S. is:

1. In combination:
   a sump chamber, the exterior of which is pressurized to a higher level than its interior, said sump chamber having an opening therein;
   a rotatable shaft journaled in said sump chamber and extending through said opening;
   an annular seal face recessed in a bore extending to the exterior of said sump chamber and surrounding the opening through which said shaft extends, said seal face extending generally normal to the axis of rotation of said shaft;
   an annular split seal element positioned within said bore and having an inner surface sealingly surrounding said shaft, said seal element having a radial face for sealingly engaging said annular sealing face;
   a garter spring surrounding said annular seal element for yieldably urging said seal element radially inward toward said shaft, the radial face on said sealing element being positioned at the axial midpoint thereof and the peripheral surfaces extending to the ends of the seal element from said radial face so that the resultant forces acting on the inner and peripheral surface of the seal element are constant irrespective of variations in pressure between the interior and exterior of said sump chamber;
   an annular retaining plate positioned within said bore and having a first face abutting said split ring element;
   a wave spring positioned within said bore and adapted to abut a second face of said annular retaining plate; and
   a retaining clip removably fixed in said bore and forming an abutment for said wave spring;

whereby the seal element annular retaining plate and wave spring may be removed from said bore without disassembly of said shaft.

2. Apparatus in claim 1 further comprising:

a bearing assembly mounted in the interior of said sump chamber for journaling said shaft, said bearing assembly being supplied with a source of lubricating fluid; and a baffle in said chamber extending radially inward to a point closely adjacent said shaft for preventing direct splashing of lubricating fluid on said seal element.